Patented June 26, 1928.

1,674,710

UNITED STATES PATENT OFFICE.

HERBERT WITTEK, OF BEUTHEN, GERMANY.

PROCESS OF SEPARATING THE NEUTRAL OILS IN TARS, TAR OILS, AND PITCHES FROM ACID CONSTITUENTS.

No Drawing. Application filed April 14, 1927, Serial No. 183,893, and in Germany August 12, 1925.

The separation of the neutral constituents of tar, tar oil and pitch from the acid constituents, mainly phenolic bodies, has hitherto almost universally been effected by means of treatment with sodium hydroxide.

According to this invention the separation is effected by dissolving, with ethyl alcohol or other organic solvent, tar, tar oil or pitch, for example crude coal tar, containing no paraffin or only little paraffin, and agitating the solution with paraffin oil or some oil mainly composed of paraffins. The paraffin oil extracts the neutral oils from the alcoholic solution. Layers are formed by the extraction, the layer containing the paraffin oil being almost free from phenol, and the alcoholic solution retaining nearly all the acid oils.

It has heretofore been proposed to make a substitute for petroleum jelly by extracting a jelly from pitch by means of a solvent such as alcohol, benzine, acetone, or other, the pitch being obtained from tar containing 50% or more of aliphatic hydrocarbons, and little, if any, aromatic hydrocarbon.

My process differs from this both in regard to the raw material, which contains little or no paraffin, and in regard to the use of two solvents.

Instead of paraffin oil I may use any oil composed of hydrocarbons of the paraffin series, for example petroleum distillates. In place of ethyl alcohol I may use any other organic solvent or mixture of solvents capable of freely dissolving phenols and not miscible with the paraffin oil or other solvent composed mainly of paraffins; examples are wood alcohol, acetone and the like, and mixtures of alcohol and benzol or tetrachloride of carbon or the like.

The kind of oil containing paraffin which is used depends on the purpose for which the extracted neutral oils are intended.

The agitation may be performed in the vapour phase, and with application of heat or pressure, or both. For working in the vapour phase I mix vapours of the alcohol, the tar oil, and the solvent mainly composed of paraffins, agitating the vapours thoroughly, and then condensing them, whereby I obtain two layers of condensate, one containing the alcohol and phenols, and the other the neutral oils.

The agitation with paraffin oil may be repeated as required, and it is advisable thereafter, in order to complete the separation, to add to the alcoholic phenol layer a small percentage of water, and to shake the mixture well. This separates the small amount of paraffin oil and other neutral oils retained by the alcoholic solution, leaving a solution of phenol free from neutral oils; the phenols can be separated by distilling off the solvent.

The associated layers of neutral oils may be washed once or twice with their weight of water, and then separated from the solvent paraffin by distillation, unless the mixture is to be used as it is. The solvent containing paraffin oil can be re-used for subsequent extractions.

Having now particularly described and ascertained the nature of my said invention and in what manner the same is to be performed I declare that what I claim is:—

1. The process of separating oils from the acid constituents of tar, tar oil or pitch which is substantially free from paraffin, comprising confining the vapour of the tar, tar oil or pitch with vapours of an organic solvent for the acid constituents not miscible with paraffin oil, and vapours of an oil composed mainly of hydrocarbons of the paraffin series, agitating the vapours, condensing the vapours and separating the resulting layers.

2. The process of separating oils from the acid constituents of tar, tar oil or pitch which is substantially free from paraffin, comprising confining the vapour of the tar, tar oil or pitch with vapours of an organic solvent for the acid constituents not miscible with paraffin oil, and vapours of an oil composed mainly of hydrocarbons of the paraffin series, applying pressure, agitating the vapours, condensing the vapours and separating the resulting layers.

3. The process of separating oils from the acid constituents of tar, tar oil or pitch which is substantially free from paraffin, comprising confining the vapour of the tar, tar oil or pitch with vapours of an organic solvent for the acid constituents not miscible with paraffin oil, and an oil composed mainly of hydrocarbons of the paraffin series, agitating the vapours, condensing the vapours adding water and again agitating, and then separating the resulting layers.

4. The process of separating oils from the acid constituents of tar, tar oil or pitch which is substantially free from paraffin, comprising confining the vapours of the tar, tar oil or pitch with vapours of an organic solvent for the acid constituents not miscible with paraffin oil, and vapours of an oil composed mainly of hydrocarbons of the paraffin series, agitating the vapours, and condensing them, separating the resulting layers, and distilling off the solvent.

In testimony whereof I affix my signature.

Dr. HERBERT WITTEK.